United States Patent
Larsen

(10) Patent No.: US 6,575,675 B1
(45) Date of Patent: Jun. 10, 2003

(54) BORING TOOL

(75) Inventor: Erik Larsen, Juelsminde (DK)

(73) Assignee: Larsen Tooling ApS, Aarhus C (DK)

( * ) Notice: Subject to any disclaimer, the term of this patent is extended or adjusted under 35 U.S.C. 154(b) by 0 days.

(21) Appl. No.: 10/007,330

(22) Filed: Nov. 8, 2001

Related U.S. Application Data

(63) Continuation of application No. PCT/DK00/00232, filed on May 9, 2000.

(30) Foreign Application Priority Data

May 12, 1999 (DK) .......................................... 1999 00666

(51) Int. Cl.[7] .............................................. B23B 29/04
(52) U.S. Cl. .......................... 408/156; 33/634; 33/637; 408/16; 408/181
(58) Field of Search ........................... 33/630, 633, 634, 33/636, 637, 639; 408/181, 156, 153, 185, 16; 407/45, 74, 78, 97

(56) References Cited

U.S. PATENT DOCUMENTS

| 1,382,447 | A |   | 6/1921  | Wells            |         |
|-----------|---|---|---------|------------------|---------|
| 2,266,339 | A | * | 12/1941 | Shutz            | 407/78  |
| 2,564,460 | A | * | 8/1951  | Blanco           | 279/6   |
| 3,282,133 | A | * | 11/1966 | Dickinson et al. | 408/156 |
| 4,428,704 | A |   | 1/1984  | Kalokhe          | 408/156 |
| 4,676,127 | A | * | 6/1987  | Watanabe         | 33/710  |
| 4,710,073 | A | * | 12/1987 | Peterson         | 408/181 |
| 5,304,019 | A | * | 4/1994  | Klee et al.      | 408/156 |

FOREIGN PATENT DOCUMENTS

| DE | 809740    |    | * | 8/1951  | ................. 408/181 |
| FR | 1303389   | A  |   | 7/1962  |                            |
| FR | 2643002   | A1 | * | 8/1990  | ................. 408/156 |
| FR | 2673555   | A  |   | 9/1992  |                            |
| FR | 2674159   | A1 | * | 9/1992  | ................. 408/156 |
| GB | 613261    | A  |   | 11/1948 |                            |
| GB | 2128117   |    |   | 4/1984  |                            |

* cited by examiner

*Primary Examiner*—Daniel W. Howell
(74) *Attorney, Agent, or Firm*—Winston & Strawn

(57) ABSTRACT

The invention relates to a boring tool that includes a boring bar having a center axis which at a top portion of the bar is arranged to be connected to a machine tool, and which at a bottom portion of the bar along the center axis is slit into two legs. The two legs can be movable towards or away from each other, such as by means of an adjusting screw, for exact adjustment of the position of the cutting tool with relation to the center axis. The tool is arranged in such a way that a joint through bar is detachably attached to the bottom of each of the legs of the boring bar. This joint through bar extends essentially perpendicular to the slit and center axis, and enables a cutting tool to be provided at the end of the bar. Hereby an especially simple tool is obtained which can be adjusted extremely precisely for fine machining of holes.

8 Claims, 1 Drawing Sheet

BORING TOOL

CROSS-REFERENCE TO RELATED APPLICATIONS

Figure 1:
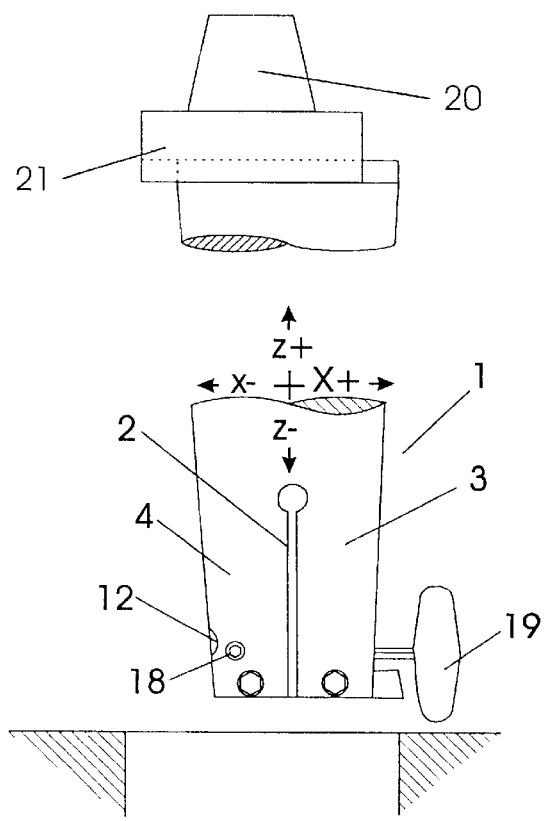

This application is a continuation of International application PCT/DK00/00232 filed May 9, 2000, the content of which is expressly incorporated herein by reference thereto.

BACKGROUND ART

The invention relates to a boring tool of the type which includes a boring bar having a center axis, which at the top is arranged to be connected to a machine tool, and where the boring bar at the bottom along the center axis is slit into two legs which firstly outermost have means for securing a tool with a cutting edge and secondly are movable by means of an adjusting screw towards or away from each other for exact adjustment of the position of the cutting edge of the tool in relation to the center axis.

Such a boring tool is also called a boring head, and is typically used at formation of large holes where a hole is formed initially by means of e.g. a drill, a miller or by casting. Before fine machining, it is machined to a small undersize. After this, the tool must be positioned precisely within the desired tolerance, and this is done by adjusting the adjusting screw after which the clearance between the two legs can be altered to put the cutting edge of the tool in a desired position.

A boring tool of this kind is known from British patent application GB 2,128,117-A. It appears in this document that it is difficult to make the exact adjustment of the position of the cutting edge before the final chip is cut as it is difficult to determine the achieved diameter change by adjustment of the adjusting screw. In reality, this is only possible by measuring with a micrometer or slide gauge directly on the cutting tool but a measuring of this kind will always have some uncertainty, and the quality will largely depend on the experience and professional qualifications of the person doing the measuring.

There are other types of boring tools where the cutting tool is on a carriage, the movement of which is controlled by screw mechanisms and where the displacement of the carriage is read directly on a divided scale. An example of this is seen in U.S. Pat. No. 3,685,917. These types of boring tools include fine mechanics which are very sensitive to dirt and which require regular greasing and other forms of maintenance in order to properly function. Also, the accuracy of such tools is furthermore often not sufficiently great. Thus, there is a need for improvements in these types of boring tools, and this is provided by the present invention.

SUMMARY OF THE INVENTION

The invention provides a boring tool of the kind mentioned in the opening paragraph that permits machining with finer tolerances and where there is no substantial demand for maintenance, and where the structure is simple and heavy-duty and the mechanical stability is very high.

These features are obtained in a boring tool comprising a boring bar having a center axis, a top portion which is arranged to be connected to a machine tool, and a bottom portion which is slit into two legs along the center axis. The legs include means for securing to the shank a cutting tool having a cutting edge and are movable towards or away from each other by means of an adjusting screw for precise adjustment of the cutting edge of the cutting tool with relation to the center axis. The shank also includes an opening in one of the two legs for determining the positional change of the cutting edge upon adjustment of the adjusting screw. Advantageously, the opening includes means for securing contact with the side of the opposite leg that faces the slit in order to determine the change in clearance between the two legs.

Preferably, the gauge is a dial gauge having a shank part. The opening may be shaped as a bore hole having a diameter corresponding to or slightly larger than the diameter of the shank part of the dial gauge.

When the boring bar has a transverse axis, the bore hole in which the dial gauge is placed preferably extends at an angle $\alpha$ relative to the transverse axis (T) of the boring bar. Also, the dial gauge contacts the side of the second leg at a point of abutment which is located at a vertical distance h from the plane of action of the tool. Thus, $\alpha$ and h are chosen so that the deflection of the dial gauge for a given boring bar indicates the change in clearance between the legs in the plane of action of the tool.

The tool further comprises a joint through bar detachably attached to each leg of the boring bar and extending essentially perpendicular to the slit and center axis so that the cutting edge is provided at the end of the bar.

Preferably, the boring bar is connected to a cone above the slit, such as via a crossbar, with the cone being arranged for attachment in a machine tool.

BRIEF DESCRIPTIONS OF THE DRAWING FIGURES

Figure 2:
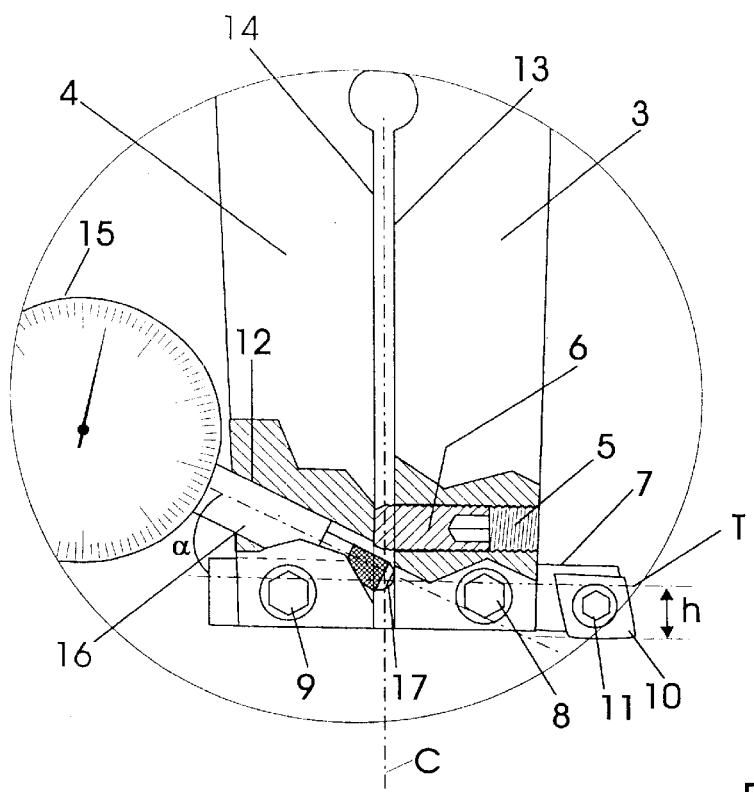

In the following an embodiment of the invention is described in detail with reference to the drawing, in which FIG. 1 is a draft of a boring tool according to the invention, seen from the side, and FIG. 2 is a partial sectional view through a boring tool with the dial gauge mounted.

DETAILED DESCRIPTION OF THE PREFERRED EMBODIMENTS

The features of the invention are obtained with a boring tool of the kind where a joint through bar is detachably attached to the bottom of each of the legs of the boring bar. This joint extends essentially perpendicular to the slit and the center axis, and the cutting edge is provided at the end of the bar.

The through bar can then be displaced to the sides in relation to the legs by means of the detachable attachment. A suitable detachable attachment can for example be a retaining screw. Because of the fact that the bar can be secured to both legs at the same time, a given setting of the spreading of the legs can be maintained during the machining. Because of the fact that one can choose between securing to one of the legs or the other during the adjustment, there will at the same time arise a number of choices of adjusting the cutting diameter, including:

The retaining screw on the leg farthest from the cutting edge is loosened and the legs are spread by means of the adjusting screw, whereupon the retaining screw is retightened. An increased diameter size is hereby obtained.

The retaining screw on the leg next to the cutting edge is loosened and the legs are spread, whereupon the retaining screw is retightened. A reduced diameter size is hereby obtained.

The retaining screw farthest from the cutting edge is loosened and the legs are brought together, whereupon the retaining screw is retightened. A reduced diameter size is hereby obtained.

The retaining screw next to the cutting edge is loosened and the legs are brought together, whereupon the retaining screw is retightened. An increased diameter size is hereby obtained.

The boring tool according to the invention is preferably utilized in machine tools for the boring of holes where the boring tool is rotated in relation to a stationary work piece in which the hole is made, and in boring machines where the boring tool is stationary whereas the work piece is rotated. The tool is furthermore utilized as tool holder in e.g. lathes which hereby will have an additional adjustment possibility.

To determine the positional change of the cutting edge upon adjustment of the adjusting screw, an opening is provided in one of the legs with means for securing a gauge so that this gauge through the opening can contact the side of the opposite leg that faces the slit with a view to determine the change in clearance between the two legs. By determining the change of the width of the slit in this way, a very precise measurement for the adjustment of the machining diameter can be obtained at the same time as the adjustment is done. The measuring of the intermotion of the legs can be done in other ways, e.g. by determination of the angle of rotation of the adjusting screw.

It would be expedient to configure the opening as a bore hole having a diameter corresponding to or slightly larger than the diameter of the shank part of a dial gauge. A dial gauge will here be easily mounted in the bore hole, and it is easy to secure it by means of a simple retaining device, e.g. a clamping screw. A dial gauge is a very conventional, well-known gauge, and it can be purchased having the necessary precision at a fair price as well. It is furthermore very easy to use, the resetting is simple and the reading can be done without difficulty. There are great advantages in designing the boring tool in such a way that the measuring of the diameter change can be done with a conventional dial gauge.

It is also expedient if the bore hole in which the dial gauge can be placed extends at an angle $\alpha$ relative to the transverse axis of the boring bar, and where the point of abutment of the dial gauge on the side of the second leg is in the distance h from the plane of action of the tool perpendicular to the centre axis. The movement of the legs can be considered as a rotation about a center of rotation situated at the upper end of the slit. For a given distance between this center of rotation and the cutting edge, the angle $\alpha$ and distance h can be chosen so that the deflection on the dial gauge during adjustment corresponds to the obtained diameter change during the subsequent machining. This is very advantageous as it is not necessary to convert from dial gauge deflection to diameter change.

FIG. 1 shows the bottom part of the device, namely the cylindrical boring bar 1 of the boring tool. The boring bar 1 includes a longitudinal slit 2 following the center axis c of the boring bar. The slit 2 divides the boring tool into two legs 3,4 which are elastically movable relative to each other. Each leg then has a contour consisting of a half circle and a plane surface 13,14 where the plane surfaces 13,14 of the two legs, which are formed by the inside faces of the slit 2, face each other. Legs having other contours are possible within the scope of the invention, e.g. quadrangular or oval contours, as long as there is a longitudinal slit between them.

In a transverse hole 5 at the bottom end of the leg 3 is introduced by means of a female thread a screw 6 which can be tightened to abut the plane surface 14 of the leg 4. By tightening the screw 6 against the plane surface 14, the two legs will elastically move away from each other.

Transversely in relation to the slit 2 and at the bottom of the two legs 3 and 4 of the boring bar 1 is placed a bar 7 which is displaceable in a flute perpendicular to the slit. Outermost on the bar 7 is a cutting edge 10 which e.g. can be a conventional replaceable ceramic tip secured to the bar 7 by a screw 11. Alternatively, this cutting edge can be a hardened and sharpened end of the bar 7 which in itself expediently can be a conventional standard turning tool. The bar 7 can be fixed to each of the two legs by means of two retaining screws 8 and 9.

In the leg 4 is a bore hole 12 extending from the outer side of the leg to the plane surface 14. In FIG. 2 it is shown how a dial gauge 15 with the shank part 16 is mounted in the bore hole 12. Through the bore hole 12 the pin 17 of the dial gauge contacts the plane surface 13 of the opposite leg 3. In FIG. 1 is seen a retaining screw 18 which is retaining the shank 16 of the dial gauge in the bore hole 12. In FIG. 1 is also seen the handle of an Allen key 19 which is used for adjustment of the screw 6.

At the top, the boring bar can be shaped with a conventional cone 20 for mounting in a machine tool but a horizontal crossbar 21 is generally built in between the boring bar and the cone 20 so that the boring bar can be displaced sideways in relation to the rotational axis of the machine tool. The crossbar 21 makes it possible to machine holes with widely different diameters.

As can be seen in FIG. 2, the bore hole 12 is made having a certain angle $\alpha$ in relation to the transverse axis T of the boring bar, and so that the pin of the dial gauge at mounting of the dial gauge in the bore hole will abut against the surface 13 in the vertical distance h to the point of action of the cutting edge. As a result of the angle $\alpha$, the travel of the dial gauge will be longer than the actual change of the clearance between the legs whereas the distance h for geometric reasons will give a smaller deflection on the dial than the horizontal travel of the legs in the point of attack of the cutting edge. By expedient choice of h and $\alpha$ in relation to the length of the legs it can be ensured that the dial gauge indicates the change of the diameter when the screw 6 is adjusted before machining of a hole. In the present device, the preferred angle $\alpha$ is 28 degrees.

EXAMPLE

The following is an example of how the boring tool according to the invention is utilized for the fine machining of a hole. At first the hole is roughly machined with a boring head so that it is 0.5 mm short of the diameter size. The fine machining must now be done in one or two steps in order to obtain the desired size and surface quality.

When this is done in two steps, a test chip is initially prepared. A size of −0.04 mm in relation to the desired final size of the diameter is aimed to be obtained with the test chip. Ensuring that the initial tightening of the adjusting screw 6 is minimal, the tool is adjusted to take a test chip of 0.23 mm, and this test chip is taken.

The subsequent measuring now indicates that the hole is 0.03 mm short of the desired diameter size. The cutting tool must consequently be displaced 0.015 mm in order to obtain the desired diameter.

The retaining screw 9 is loosened, and the bar 7 is now retained by the retaining screw 8 to the leg 3. The dial gauge 15 is now mounted in the bore hole 12 and zeroed. The adjusting screw 6 is tightened until the dial gauge is indicating an increase of the slit of 0.03 mm which is read directly on the dial. Hereby the bar 7 will be displaced 0.015 mm as desired.

The retaining screw 9 is tightened whereby the bar 7 is now secured stably again in the now displaced position and the dial gauge and the Allen key are removed after which the final machining can be done.

What is claimed is:

1. A boring tool comprising a boring shank having a center axis, a top portion which is arranged to be connected to a machine tool, and a bottom portion which includes first and second legs separated by a slit and extending along the center axis, which legs include means for securing to the shank a cutting tool having a cutting edge and are movable towards or away from each other by means of an adjusting screw for precise adjustment of the cutting edge of the cutting tool with relation to the center axis, and an opening is provided in the first leg for determining the positional change of the cutting edge upon adjustment of the adjusting screw, wherein the opening includes means for contacting the side of the second leg to provide information usable to change the clearance between the legs by the adjusting screw.

2. The tool of claim 1 wherein the contacting means is a dial gauge having a shank part.

3. The tool of claim 2, wherein the opening is shaped as a bore hole having a diameter corresponding to or slightly larger than the diameter of the shank part of the dial gauge.

4. The tool of claim 3, wherein the boring shank has a transverse axis, the bore hole in which the dial gauge is placed extends at an angle $\alpha$ relative to the transverse axis (T) of the boring shank, and the dial gauge contacts the side of the second leg at a point of abutment which is located at a vertical distance h from the plane of action of the tool, where $\alpha$ and h are chosen so that the deflection of the dial gauge for a given boring shank indicates the change in clearance between the legs in the plane of action of the tool.

5. The tool of claim 1 which further comprises a bar detachably attached to each leg of the boring shank and extending essentially perpendicular to the slit and center axis so that the cutting edge is provided at the end of the shank.

6. The tool of claim 1, wherein the boring shank is connected to a cone above the slit with the cone being arranged for attachment in a machine tool.

7. The tool of claim 6 wherein the boring shank is connected to the cone via a crossbar.

8. The tool of claim 5 wherein the bar is detachably attached to the bottom of each of the legs.

* * * * *